May 22, 1962 K. H. HACKLÄNDER 3,035,280
METHOD OF WORKING EXPANDED PLASTIC AND
ARTICLES MADE BY THE METHOD
Filed Aug. 16, 1956
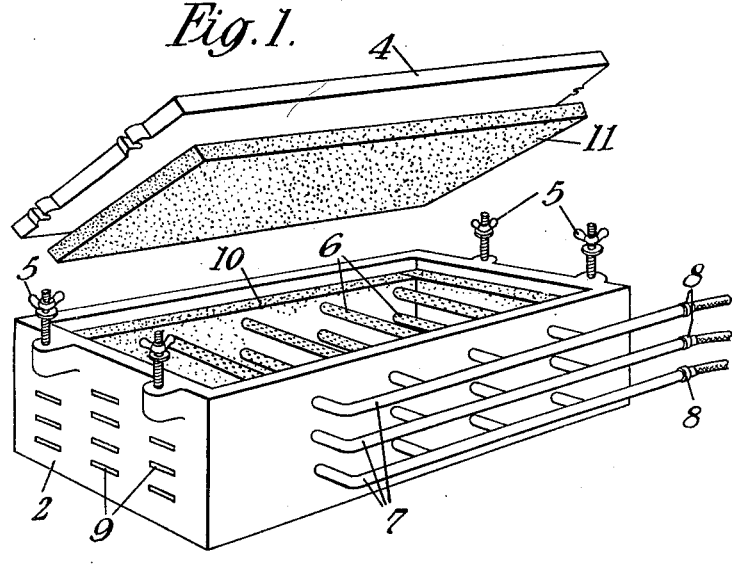
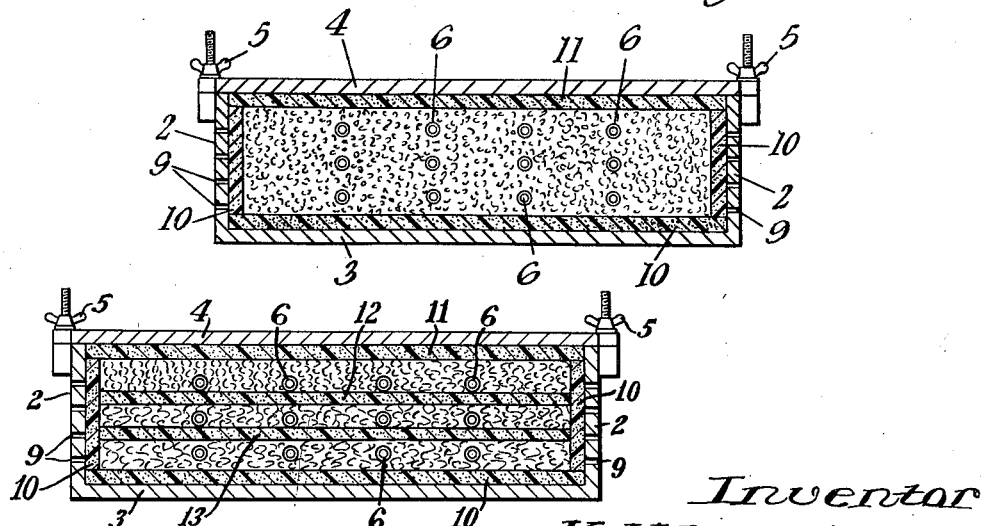
Inventor
K. H. Hackländer
By Glascock Downing Seebold
Attys

United States Patent Office 3,035,280
Patented May 22, 1962

3,035,280
METHOD OF WORKING EXPANDED PLASTIC AND ARTICLES MADE BY THE METHOD
Karl Hermann Hackländer, Vaduz, Liechtenstein, assignor to Agricola Reg. Trust, Vaduz, Liechtenstein
Filed Aug. 16, 1956, Ser. No. 604,469
7 Claims. (Cl. 5—337)

This invention relates to a method of working expanded plastic and articles made thereby.

It has been observed that when an expanded plastic such as, for example, that made from polyurethane and sold under the name "Moltopren" is subjected to a heat treatment, for example by heating in an oven or by passing a heated gas or vapour through the pores of the material, either in the raw state or when made up into an article such as a mattress, pillow or upholstery, the material is caused to expand and become more resilient, which condition is maintained after completion of the heating process, and the invention therefore consists in a method of expanding and increasing the resilience of an expanded plastic of the kind having interconnected pores comprising heating the plastic in an oven or mould.

The invention further consists in a method as set forth above in which the plastic is heated by pressing heated gas or vapour through the said pores.

The invention further consists in articles of manufacture made of expanded plastic treated by the above method.

Where the material is thermoplastic the temperature of the gas or vapour may be raised above the incipient melting point of the material whereby hitherto separate particles, constituting for example, the filling of a pillow, mattress or the like, adhere to one another and on removal of the heat become joined thus preventing the displacing of the particles of filling by the shaking or subsequent use of the article.

The advantage of such a method is that due to the combined effect of expansion of the particles and the melting of the same where they make contact a most effective joining of the filling is obtained without the necessity of applying pressure from the outside.

The accompanying drawing shows by way of example only one embodiment of the mould for carrying the invention into effect in which:

FIGURE 1 is a perspective view of the mould with the lid lifted, while

FIGURE 2 is a longitudinal section of the mould with the lid in position.

FIGURE 3 is a sectional view showing a modification of the structure of FIGURE 2.

The mould illustrated may be used for the construction of mattresses, pillows or seat squabs or the like and comprises a box-like structure having sides 1, ends 2, bottom 3 and removable top 4 which is held in position by means of the butterfly nuts 5 and which is removable to fill the mould and remove the finished article.

The mould is provided with a series of perforated tubes 6 which can be removably inserted through holes in the sides of the mould and which are provided with interconnecting tubes 7 and connecting means 8 for connecting the tubes with a source of heated gas of vapour.

The ends 2 of the mould are provided with ventilating slots 9 by way of which the gas or vapour may escape after having traversed the material in the mould.

The mould is prepared by lining it with sheets of thermoplastic expanded plastic such as "Moltopren," positioning the perforated tubes through holes in the lining 10 and filling the spaces between the tubes with shavings or granules of the same material. A sheet 11 of the material is placed on top and the mould closed. Steam or heated air is passed through the tubes into the filling material which expands, thereby increasing the resilience of the finished article. By raising the temperature of the gas or vapour above the melting point of the plastic the separate parts of the mattress are caused to adhere together when the temperature is lowered and the plastic allowed to set.

It is preferred to use for the filling curled long rod-like pieces of expanded plastic by reason of the many voids produced in the article when the heating process has been carried out, additional resilience thereby being imparted to the article.

At the completion of the process the tubes are withdrawn and the article removed from the mould.

In a further method of carrying the invention into effect the filling of a mattress, bolster or the like may be of two or more parts, layers or pockets of expanded plastic having different incipient melting points so that, although the whole article may be subjected to the same temperature, different parts are melted to a different degree, and thus produce parts, layers or pockets in the finished article of stronger and not so flexible a nature. For example, a mattress may be thus produced which has a stronger layer sandwiched between two or more resilient layers. FIGURE 3 shows such layers which may be made by fusing a portion of resilient material more than the loose filling in the whole article. These layers obviously serve to retain the general shape of the upholstery.

These layers are numbered 12 and 13 and may be the same composition as part 11.

The parts, layers or pockets may be introduced by spraying the filling, for example, with liquid polyethylene as the mould is filled or by sprinkling thermoplastic powder of a lower melting point than the filling over the latter as the mould is filled. The quantities and thickness of the material of lower melting point are adjusted to suit the purposes to which the finished article is to be put.

The invention is not restricted to the use of an expanded plastic outer envelope or covering for the mattress, pillow or the like as a variety of materials may be used. The air or steam may pass between tube and tube or between a tube or tubes and apertures provided in the walls of the mould.

The mattress, pillow or the like may be filled with layers of sheets of expanded plastic instead of shavings or granules or curled pieces, as above referred to, but separate pieces in some form or other are preferred as this material may be obtained as off cuts or as a waste from other processes.

The invention further consists in a mould for carrying out the process above defined comprising a box-like structure one side at least of which is detachable and having one or more perforated tubes removably positioned therethrough for the passage of hot gas or vapour.

It is to be understood that the above description is by way of example only and that details for carrying the invention into effect may be varied without departing from the scope of the invention.

I claim:

1. Pillow, cushion, upholstery, mattress or the like comprising an outer covering and a resilient filling, said filling consisting essentially of discrete shreds and granules of thermoplastic resilient expanded polyurethane plastic having interconnected pores, the shreds and granules being held together by light surface adhesion, the adhering portions of surface being lightly welded together.

2. An upholstery as defined in claim 1, wherein the covering consists of sheets of polyurethane, the contacting portions of which are united by incipient fusion.

3. Pillow, cushion, upholstery, mattress or the like comprising an outer covering and a resilient filling, said filling consisting essentially of layers of discrete shreds and granules of thermoplastic resilient expanded polyurethane plastic having interconnected pores, the shreds and granules being lightly welded together for loose adhesion and sustained resilience, at least one layer of said plastic of increased tensile strength being interspersed between said layers of plastic.

4. A resilient filling material for pillows, cushions, upholstery, mattresses or the like consisting essentially of discrete shreds and granules of thermoplastic resilient expanded polyurethane plastic having interconnected pores, the shreds and granules being held together by light surface adhesion, the adhering portions of surface being lightly welded together.

5. A resilient filling material as defined in claim 4, wherein the granules are welded together by incipient fusion of their surfaces by means of a hot fluid in the gaseous state.

6. A resilient filling as defined in claim 4, wherein the granules are welded together by a spray of liquid polyethylene.

7. A resilient filling material for pillows, upholstery, mattresses or the like consisting essentially of layers of discrete shreds and granules of thermoplastic resilient expanded polyurethane plastic having interconnected pores, the shreds and granules being lightly welded together for loose adhesion and sustained resilience, at least one layer of said plastic of increased tensile strength being interspersed between said layers of plastic.

References Cited in the file of this patent

UNITED STATES PATENTS

| | | |
|---|---|---|
| 2,602,193 | Korkatti | July 8, 1952 |
| 2,678,293 | McMillan et al. | May 11, 1954 |
| 2,681,321 | Stastny et al. | June 15, 1954 |
| 2,691,191 | Butsch | Oct. 12, 1954 |
| 2,707,804 | Thornburg | May 10, 1955 |
| 2,720,660 | Smith | Oct. 18, 1955 |
| 2,744,291 | Stastny et al. | May 8, 1956 |
| 2,750,606 | Freedlander | June 19, 1956 |
| 2,767,433 | De Caussemaker et al. | Oct. 23, 1956 |
| 2,779,062 | Stastny | Jan. 29, 1957 |
| 2,780,350 | Simon et al. | Feb. 5, 1957 |
| 2,787,809 | Stastny | Apr. 9, 1957 |
| 2,836,228 | Dahle | May 27, 1958 |
| 2,892,216 | Steel | June 30, 1959 |

OTHER REFERENCES

". . . Dylite Expandable Polystyrenes," Koppers 1954.